T. COTÉ.
FISHHOOK.
APPLICATION FILED FEB. 21, 1920.

1,338,856.

Patented May 4, 1920.

WITNESSES:
M. E. Fay

INVENTOR
BY Theodore Coté.
Geo. Stevens
ATTORNEY

UNITED STATES PATENT OFFICE.

THEODORE COTÉ, OF DULUTH, MINNESOTA.

FISHHOOK.

1,338,856.     Specification of Letters Patent.     Patented May 4, 1920.

Application filed February 21, 1920. Serial No. 360,281.

*To all whom it may concern:*

Be it known that I, THEODORE COTÉ, a citizen of the United States, residing at Duluth, in the county of St. Louis and State of Minnesota, have invented certain new and useful Improvements in Fishhooks, of which the following is a specification, reference being had therein to the accompanying drawing.

This invention relates to fish hooks and has special reference to such a hook having means for carrying live bait.

The principal object is to provide an exceptionally attractive lure for fish.

Other objects and advantages of the novel structure and combination will appear in the further description of the invention.

Referring to the accompanying drawings forming part of this application and in which like reference characters indicate like parts:

1 represents the body portion of the lure which is composed of a single piece of spirally wound spring wire suitable for the purpose, the general outline of which resembles a small fish or minnow. The after termination of the coiled wire is formed with a suitable eye for engagement with the cluster of hooks 2 as are commonly used in such devices, and forward of the center of the body portion and preferably upon either side thereof is attached one or more hooks 3, while the forward end of the coiled wire terminates in a suitable eye into which the swivel 4 common to such devices is attached.

The spiral coils of which the body portion is composed are spaced apart longitudinally thereof a suitable distance to permit of the bait held therein being seen from the exterior thereof and also to permit of any exudations such as oils and other odoriferous substances attractive to game fish, being freed therefrom.

Figure 2:
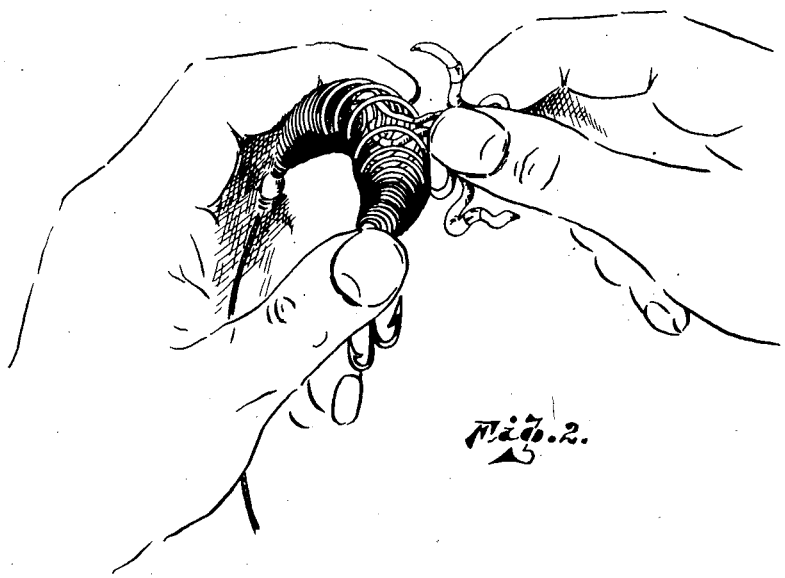
Fig. 2 is a perspective illustration showing certain manipulations of the device.

In Fig. 2 is illustrated one method of opening the coils of the body portion of the hook for the insertion of bait such as angle worms or the like, it being understood that the coils normally remain sufficiently close together to prevent the worms from becoming liberated therefrom and in fact portions of the bait may be left protruding from between the coils, though preferably not worms as viewed from a humanitarian standpoint, and in fact one of the objects of this form of lure is to enable the sportsman to use live bait without exercising the element of cruelty as regards the bait employed.

Figure 1:
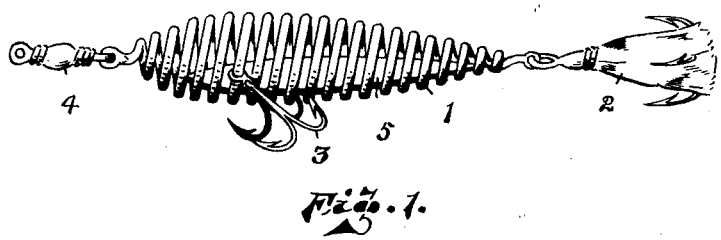
Figure 1 is a side elevation of my improved fish hook or lure.

In Fig. 1 I have illustrated at 5 an oblong strip of pork which is known by those skilled in the art to be exceptionally attractive to certain kinds of fish and within this lure it is quite evident that the same will retain its general shape and the glistening, oily surface be readily seen through the coils as it passes through the water and it is apparent that in lieu of the pork a live minnow might be used with equally as good if not better results.

The element of resiliency which is considered of material advantage in this form of hook is also evident and which is known to frequently result in a more sure catch.

I am aware that spiral springs have been used in connection with fish hooks and fishing tackle prior to my present invention but the combination here illustrated, and as more specifically pointed out in the appended claims is deemed a material advance in the art.

Having thus described my invention, what I claim and desire to secure by Letters Patent is:

1. A lure of the character described comprising a spirally wound resilient wire the coils of which are normally spaced apart, hooks attached to the sides of the body portion and hooks attached to the after end of the body portion, substantially as described.

2. A lure of the character described comprising in combination a body portion made of a spirally wound piece of wire the loops of which are spaced apart, bait carried within the body portion and hooks attached to the exterior of the body portion.

3. A lure of the character described comprising a body portion composed of a spirally wound resilient wire the coils of which are spaced apart and being greater in diameter forward of the end of the body portion than they are at the rear to resemble in general shape a fish, and to comfortably contain a small one, the coils at the ends of the body portion being reduced in size to prevent the escape of such bait, hooks at the after end of the body portion, hooks attached to the sides of the body portion and a swivel connected to the forward end thereof.

In testimony whereof I hereunto affix my signature in the presence of two witnesses.

THEODORE COTÉ.

Witnesses:
W. L. LALIBERTE,
S. GEO. STEVENS.